Figure 1:
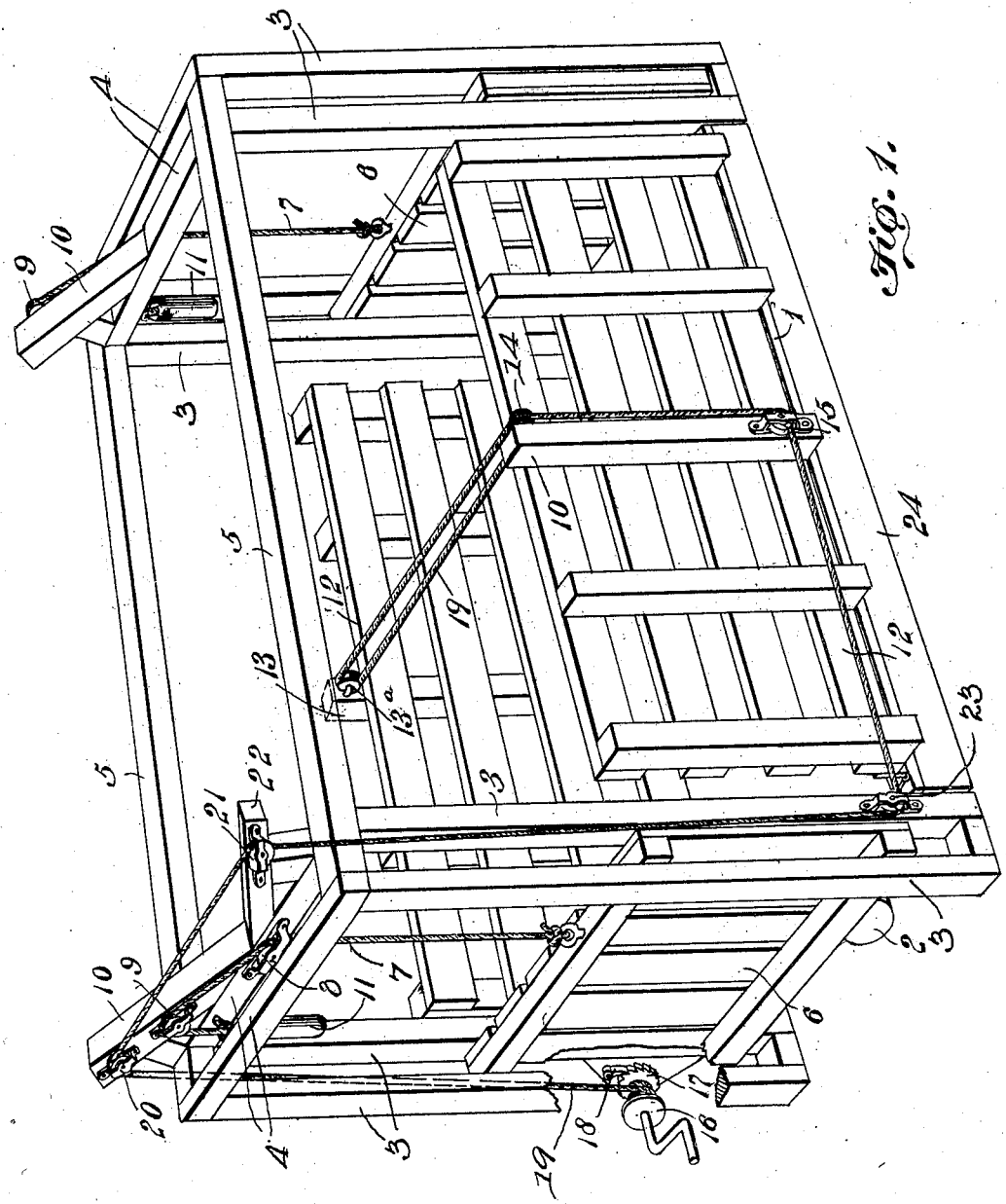

No. 836,264. PATENTED NOV. 20, 1906.
B. G. LABACHOTTE.
CATTLE STOCK.
APPLICATION FILED APR. 2, 1906.

2 SHEETS—SHEET 1.

Bernard G. Labachotte,
INVENTOR

WITNESSES:

By C. A. Snow & Co.
ATTORNEYS

No. 836,264.  PATENTED NOV. 20, 1906.
B. G. LABACHOTTE.
CATTLE STOCK.
APPLICATION FILED APR. 2, 1906.
2 SHEETS—SHEET 2.
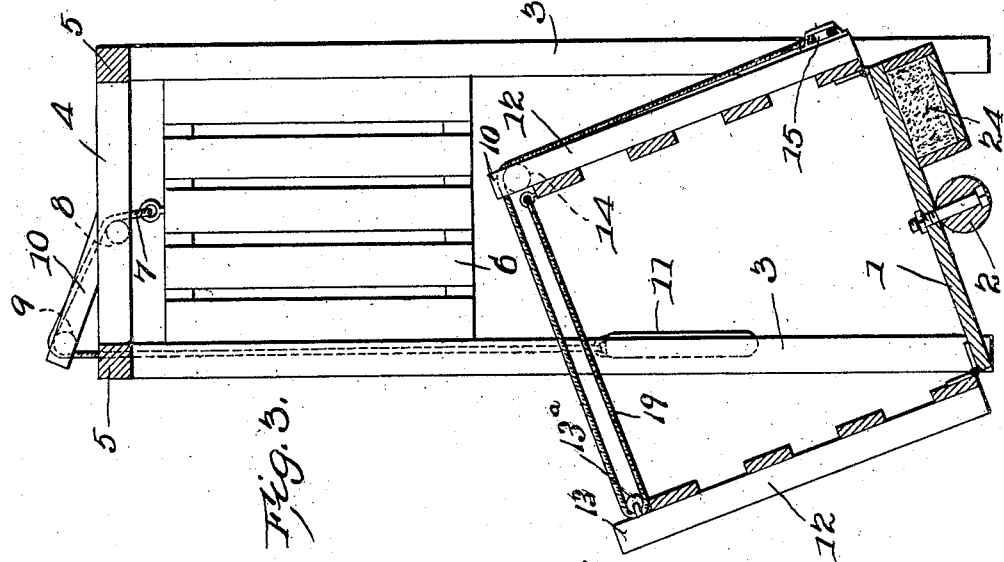
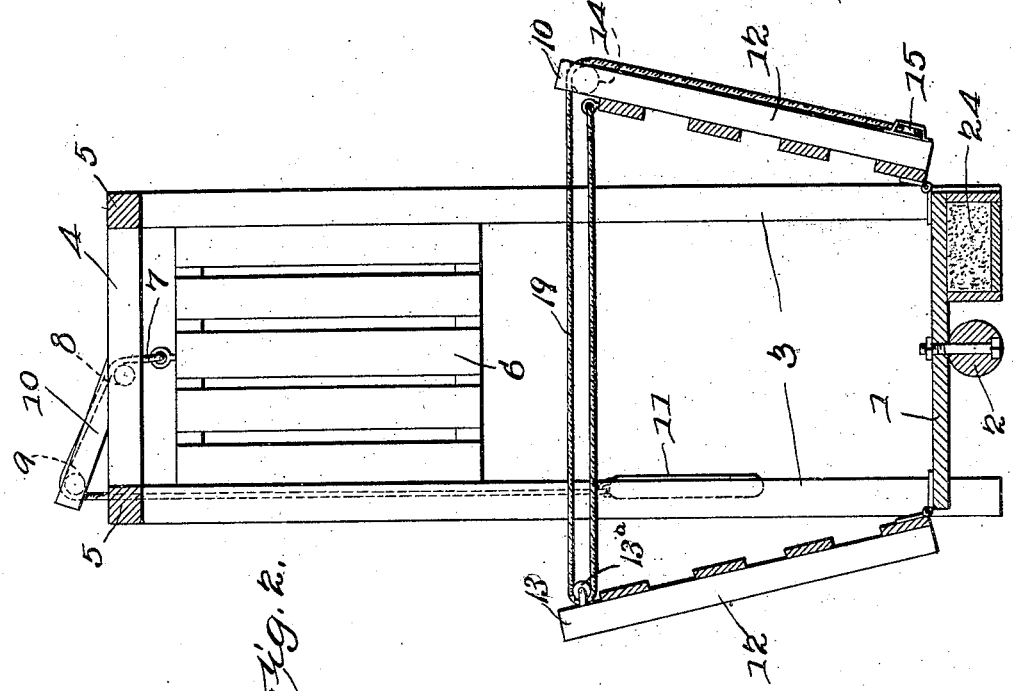
WITNESSES:
Bernard G. Labachotte,
INVENTOR.
By
ATTORNEYS

UNITED STATES PATENT OFFICE.

BERNARD G. LABACHOTTE, OF PORTERSVILLE, CALIFORNIA.

CATTLE-STOCK.

No. 836,264.  Specification of Letters Patent.  Patented Nov. 20, 1906.

Application filed April 2, 1906. Serial No. 309,419.

*To all whom it may concern:*

Be it known that I, BERNARD G. LABACHOTTE, a citizen of the United States, residing at Portersville, in the county of Tulare and State of California, have invented a new and useful Cattle-Stock, of which the following is a specification.

This invention relates to cattle-stocks; and its object is to provide a device of this character which is particularly adapted for holding cattle while being branded.

Another object is to provide a device of this character which can be closed upon an animal and hold it, so as to enable the operator to brand it without difficulty.

A still further object is to provide a stock which can be tilted while holding an animal, so as to facilitate the branding operation.

With the above and other objects in view the invention consists of a platform which is mounted to tilt from one side to the other and has side and end gates supported adjacent thereto, said side gates being adapted to swing upward against the sides of an animal, so as to hold it practically immovable while the device is being tilted.

The invention also consists of certain other novel features of construction and combination of parts, which will be hereinafter more fully described, and pointed out in the claims.

In the accompanying drawings is shown the preferred form of the invention.

In said drawings, Figure 1 is a perspective view of the stock, showing the same closed. Fig. 2 is a transverse section showing it opened. Fig. 3 is a transverse section showing the closed device tilted.

Referring to the figures by numerals of reference, 1 is a platform which is mounted along its longitudinal center upon a tilting bar 2, and extending upward near the ends of the platform are standards 3, connected by end beams 4 and side beams 5, so as to produce a rigid frame above said platfrom. Slidably mounted between the standards 3 at the ends of the platform are gates 6, having supporting-ropes 7 extending therefrom over pulleys 8, secured to the end beams 4, and thence over pulleys 9, supported by arms 10, extending upward from the end beams. Weights or counterbalances 11 are secured to these ropes, so as to facilitate the hoisting of the gates. The tilting bar 2 rests upon the ground, although, if preferred, the same may be rotatably mounted at its ends within a suitable support provided for it.

A side gate 12 is hinged to each side of the platform 1 and has an arm 13 extending upward from it. One of these arms has a pulley 14 at its upper end and another pulley 15 at its lower end. A windlass having a ratchet 17 and a pawl 18 for controlling its movement is mounted on one of the standards 3, and a cable 19 extends therefrom and upward over a pulley 20, located on one of the arms 10. Said cable 19 also extends over a pulley 21, mounted on another arm 22, located on one of the end beams 4, and from this pulley 21 the cable 19 extends downward under a pulley 23, located at the lower portion of the standard 3 adjacent the one to which the windlass is connected. The cable 19 extends over a pulley 23, under pulley 15, and thence over the pulley 14, it being also mounted on a pulley $13^a$ on the arm 13 of the gate 12, located at the other side of the platform, the end of said cable being fastened to the arm 10. Arranged along one side of the platform is a sand-box 24, which constitutes a counterbalance for the apparatus, so as to facilitate returning it to its initial position after it has once been tilted. As shown in the drawings, the sand-box is disposed under the platform and serves to normally support the platform in a horizontal position.

By using this stock one of the gates 6 is raised and the animal to be branded is driven onto the platform toward the other gate 6. While it is in position on the platform the windless 16 is turned so as to wind the cable 19 thereon, and as a result the two side gates 12 will be swung upward toward each other and will securely hold the animal in position therebetween. Meanwhile the open end-gate 6 has been closed, and the animal is thus securely confined upon the platform. The platform can then be tilted upon the bar 2, so that the animal will be held in an inclined position to facilitate branding, and at the completion of the operation the structure can be returned to its original position, such movement being facilitated by the counterbalance or sand-box 24.

I claim—

1. A cattle-stock comprising a tilting bar, a platform resting thereon, said bar extending longitudinally along the center of the platform, and means for confining an animal upon the platform.

2. A cattle-stock comprising a tilting bar, platform resting thereon and adapted to be tilted, said bar extending longitudinally along the center of the platform, side gates connected to and movable with the platform, and means for simultaneously moving said gates toward opposite sides of an animal upon the platform.

3. A cattle-stock comprising a tilting bar, a platform resting, and adapted to be tilted thereon, said bar extending longitudinally along the center of the platform, side gates hinged to and movable with the platform, means for moving said gates simultaneously toward each other to confine an animal therebetween, and end gates movably mounted adjacent but detached from the platform.

4. A cattle-stock comprising a tilting bar, a platform mounted, and adapted to tilt upon the bar, said bar extending longitudinally along the center of the platform, means for confining an animal upon the platform, and a platform-counterbalancing weight rigidly connected to one edge of the platform.

5. A cattle-stock comprising a tilting bar, a platform mounted, and adapted to tilt upon the bar, said bar extending longitudinally along the center of the platform, means for confining an animal upon the platform, and a platform-counterbalancing weight extending longitudinally along one edge of the platform.

6. A cattle-stock comprising a tilting bar, a platform mounted, and adapted to tilt upon the bar, said bar extending longitudinally along the center of the platform, means for confining an animal upon the platform, and a weight extending longitudinally along one edge of the platform for maintaining the platform normally in a horizontal position.

7. A cattle-stock comprising a tilting bar, a platform resting, and adapted to tilt upon the bar, said bar extending longitudinally along the center of the platform, a weight extending along one edge of the platform for holding the platform normally in horizontal position, side gates hinged to the platform, a flexible connection between said gates, means for drawing said connection to pull the gates together.

8. A cattle-stock comprising a tilting bar, a platform resting, and adapted to tilt upon the bar, said bar extending longitudinally along the center of the platform, a weight extending along one edge of the platform for holding the platform normally in horizontal position, side gates hinged to the platform, a flexible connection between said gates, means for drawing said connection to pull the gates together, a stationary frame extending over and beyond the ends of the platform, and gates movably mounted within the frame adjacent the ends of the platform.

In testimony that I claim the foregoing as my own I have hereto affixed my signature in the presence of two witnesses.

BERNARD G. LABACHOTTE.

Witnesses:
ROBT. HORBACH,
W. G. COLLIER.